(12) United States Patent
Micke

(10) Patent No.: US 10,875,513 B2
(45) Date of Patent: Dec. 29, 2020

(54) PUMP ASSEMBLY FOR A HYDRAULIC VEHICLE BRAKING SYSTEM

(71) Applicant: Robert Bosch GmbH, Stuttgart (DE)

(72) Inventor: Marc Micke, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/778,136

(22) PCT Filed: Sep. 28, 2016

(86) PCT No.: PCT/EP2016/073076
§ 371 (c)(1),
(2) Date: May 22, 2018

(87) PCT Pub. No.: WO2017/089008
PCT Pub. Date: Jun. 1, 2017

(65) Prior Publication Data
US 2018/0326959 A1  Nov. 15, 2018

(30) Foreign Application Priority Data

Nov. 27, 2015  (DE) .......................... 10 2015 223 508

(51) Int. Cl.
*B60T 13/16* (2006.01)
*B60T 13/66* (2006.01)
(Continued)

(52) U.S. Cl.
CPC .......... *B60T 13/161* (2013.01); *B60T 8/4072* (2013.01); *B60T 8/4081* (2013.01); *B60T 13/146* (2013.01);
(Continued)

(58) Field of Classification Search
CPC .... B60T 8/4072; B60T 8/4081; B60T 8/1755; B60T 8/176; B60T 13/161; B60T 13/16;
(Continued)

(56) References Cited

U.S. PATENT DOCUMENTS 6,234,199 B1 *  5/2001  Nohira .................... B60T 8/368
                                              137/557
6,398,315 B1 *  6/2002  Dinkel .................... B60T 8/368
                                              303/113.1
(Continued)

FOREIGN PATENT DOCUMENTS

CN         101746371 A      6/2010
CN         104590228 A      5/2015
(Continued)

OTHER PUBLICATIONS

International Search Report for PCT/EP2016/073076, dated Jan. 24, 2017.

*Primary Examiner* — Thomas W Irvin
(74) *Attorney, Agent, or Firm* — Norton Rose Fulbright US LLP; Gerard A. Messina

(57) ABSTRACT

A pump assembly for generating a brake pressure in a hydraulic slip-controlled power vehicle braking system, including a fluid sensor between an electric motor and a piston cylinder unit with the aid of which a small brake fluid quantity inadvertently leaking from the piston cylinder unit in the form of leakage is ascertainable before it affects a function of an electronic control or the electric motor.

5 Claims, 1 Drawing Sheet

(51) Int. Cl.
  *B60T 13/68* (2006.01)
  *B60T 8/40* (2006.01)
  *B60T 13/74* (2006.01)
  *B60T 13/14* (2006.01)
  *B60T 17/22* (2006.01)
  *B60T 8/1755* (2006.01)
  *B60T 8/176* (2006.01)
  *B60T 13/62* (2006.01)
  *F04B 17/03* (2006.01)
  *F04B 19/22* (2006.01)

(52) U.S. Cl.
  CPC .......... *B60T 13/662* (2013.01); *B60T 13/686* (2013.01); *B60T 13/745* (2013.01); *B60T 17/22* (2013.01); *B60T 8/176* (2013.01); *B60T 8/1755* (2013.01); *B60T 13/62* (2013.01); *B60T 2270/10* (2013.01); *B60T 2270/20* (2013.01); *B60T 2270/30* (2013.01); *F04B 17/03* (2013.01); *F04B 19/22* (2013.01)

(58) Field of Classification Search
  CPC .... B60T 13/146; B60T 13/662; B60T 13/686; B60T 13/745; B60T 13/62; B60T 17/22; B60T 2270/10; B60T 2270/20; B60T 2270/30; F04B 17/03; F04B 19/22
  See application file for complete search history.

(56) References Cited

U.S. PATENT DOCUMENTS

| | | | | |
|---|---|---|---|---|
| 8,011,289 B2* | 9/2011 | Waller | ............... | B60T 8/368 92/242 |
| 8,020,946 B2* | 9/2011 | Iyatani | ............... | B60T 8/368 137/884 |
| 9,365,199 B2* | 6/2016 | Drumm | ............... | B60T 8/3655 |
| 9,637,102 B2* | 5/2017 | Drumm | ............... | B60T 7/042 |
| 10,683,000 B2* | 6/2020 | Feigel | ............... | B60T 13/145 |
| 2004/0090115 A1* | 5/2004 | Inoue | ............... | B60T 8/368 303/119.3 |
| 2005/0269875 A1 | 12/2005 | Maki et al. | | |
| 2006/0138860 A1* | 6/2006 | Hinz | ............... | B60T 8/368 303/119.3 |
| 2006/0220768 A1* | 10/2006 | Iyatani | ............... | B60T 8/368 335/78 |
| 2009/0183958 A1 | 7/2009 | Sano et al. | | |
| 2012/0043806 A1* | 2/2012 | Linkenbach | ............... | B60T 8/4872 303/113.1 |
| 2012/0169112 A1* | 7/2012 | Jungbecker | ............... | B60T 8/4081 303/9.75 |
| 2012/0326492 A1* | 12/2012 | Mayer | ............... | B60T 8/4081 303/9.72 |
| 2013/0291535 A1* | 11/2013 | Leiber | ............... | B60T 13/686 60/545 |
| 2014/0225425 A1* | 8/2014 | Drumm | ............... | B60T 13/146 303/9.75 |
| 2016/0221562 A1* | 8/2016 | Leiber | ............... | B60T 13/686 |
| 2017/0327098 A1* | 11/2017 | Leiber | ............... | B60T 7/042 |
| 2018/0304875 A1* | 10/2018 | Yamaguchi | ............... | F16K 31/0658 |

FOREIGN PATENT DOCUMENTS

| | | |
|---|---|---|
| DE | 3122336 A1 | 3/1982 |
| DE | 102013110188 A1 | 3/2015 |
| DE | 102013111974 A1 | 4/2015 |
| JP | H0558260 A | 3/1993 |
| JP | H0747946 A | 2/1995 |
| JP | 2000272497 A | 10/2000 |
| WO | 2012150120 A1 | 11/2012 |

* cited by examiner

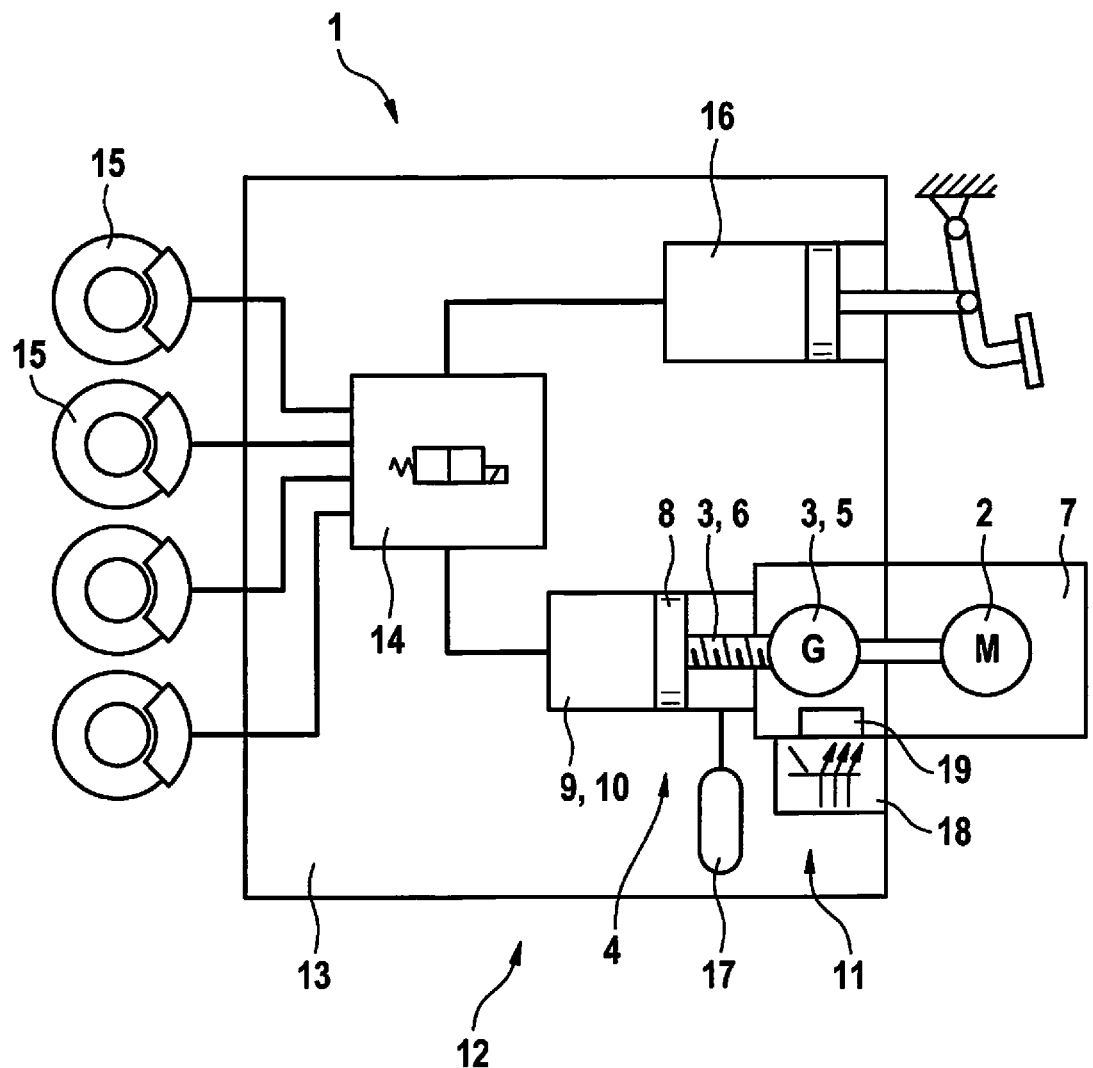

PUMP ASSEMBLY FOR A HYDRAULIC VEHICLE BRAKING SYSTEM

FIELD OF THE INVENTION

The present invention relates to a pump assembly for a hydraulic vehicle braking system. The pump assembly is in particular provided for generating a brake pressure for actuating a hydraulic power vehicle braking system using external power and/or for generating a brake pressure or for delivering brake fluid for a slip control of a hydraulic vehicle braking system.

BACKGROUND INFORMATION

Slip controls such as anti-lock systems, traction control systems, and electronic stability control systems or electronic stability programs, for which the abbreviations ABS, TCS, ESC and ESP are commonly used, are known for hydraulic vehicle braking systems. For this purpose, wheel brake pressures in wheel brake cylinders of the wheel brakes of hydraulic vehicle braking systems are controlled with the aid of brake pressure build-up valves and brake pressure release valves which are also referred to as inlet and outlet valves. A brake pressure build-up valve and a brake pressure release valve, whose functions may also be combined in one valve, are assigned to each wheel brake cylinder for a wheel-individual pressure control. A brake pressure is generated using muscle power or assisted power with the aid of a brake master cylinder, which may include a brake booster, and/or using external power with the aid of a hydraulic pump which is drivable with the aid of an electric motor. Such slip controls are known per se and are not explained here in greater detail. The unexamined patent application DE 10 2006 026 872 A1 is referred to here as an example.

A hydraulic power vehicle braking system which has a slip control of the type elucidated above is known from the international patent application WO 2012/150 120 A1. In the case of this vehicle braking system, a brake pressure for service braking and slip control is generated using a piston cylinder unit whose piston is drivable with the aid of an electric motor via a mechanical transmission. A brake master cylinder, which is operated via muscle power, is used as a setpoint value indicator for a brake pressure or a brake force during service braking and as a brake pressure generator for assisted braking in the case of failure of the piston cylinder unit including its drive. Hydraulic components of the vehicle braking system, such as solenoid valves, check valves, piston pumps, hydraulic accumulators, damping chambers, and pressure sensors, the already mentioned piston cylinder unit and the brake master cylinder, are accommodated in a hydraulic block and are hydraulically interconnected with one another via bores in the hydraulic block. Electric motors for driving the piston pumps and the piston cylinder unit are also attached on the hydraulic block. Such a hydraulic block is not a required component of the present invention, but is, however, a feature of the exemplary embodiments.

SUMMARY OF THE INVENTION

The pump assembly according to the present invention having the features according to the definition of the species in claim 1 is provided for a hydraulic, slip-controlled and/or power vehicle braking system and is used to generate a brake pressure and/or to deliver brake fluid. The pump assembly includes an electric motor and a hydraulic pump which is drivable with the aid of the electric motor. The hydraulic pump may include a piston cylinder unit or be a piston cylinder unit. A gear pump may, for example, also be used as the hydraulic pump. Furthermore, one or multiple transmissions may be present via which the electric motor drives the hydraulic pump. The transmission may include a reduction gear unit which reduces a rotational speed and converts a torque. The transmission may include a worm gear or any other type of gear which converts a rotary driving motion of the electric motor into a displacement toward a lift drive of a piston in a cylinder (or vice versa) of the hydraulic pump or of a piston cylinder unit.

According to the present invention, the pump assembly includes a fluid sensor for ascertaining brake fluid which leaks from the hydraulic pump or also other hydraulic components. The fluid sensor makes it possible to ascertain leaking brake fluid before the brake fluid, for example, affects or renders inoperative an electronic system for controlling or regulating a brake pressure or a brake force and/or an electronic system for slip control, or before it enters the electric motor. The leaked brake fluid may, for example, be ascertained by measuring the resistance on a circuit board of an electronic system of the pump assembly where the leaked brake fluid reduces an electrical resistance or generates an ohmic connection when entering the circuit board.

The further embodiments and descriptions herein provide advantageous embodiments and refinements of the subject matter of the present invention described herein.

The present invention is explained in greater detail below on the basis of one specific embodiment illustrated in the drawing.

BRIEF DESCRIPTION OF THE DRAWING

The FIGURE shows a circuit diagram of a pump assembly according to the present invention.

DETAILED DESCRIPTION

Pump assembly 1 according to the present invention illustrated in the drawing includes an electric motor 2, a transmission 3, and a piston cylinder unit 4 as hydraulic pump 10 which is drivable with the aid of electric motor 2 via transmission 3. Transmission 3 includes a planetary gear set 5 and a worm gear 6. Planetary gear set 5 is accommodated in a housing 7 of electric motor 2 and is used as a reduction gear unit which reduces a rotational speed of electric motor 2 and converts a torque of electric motor 2. Electric motor 2 drives worm gear 6, which may be configured as a ball screw, for example, via planetary gear set 5. Worm gear 6 converts a rotary motion of planetary gear set 5 into a displacement and drives a piston 8 of piston cylinder unit 4 to carry out an axial up and down movement in a cylinder 9 of piston cylinder unit 4. Worm gear 6 may therefore be generally understood as a converter or a conversion gear which converts a rotary motion into a displacement. The up and down movement of piston 8 in cylinder 9 alternatingly displaces brake fluid from cylinder 9 and sucks brake fluid into cylinder 9, whereby a brake pressure is generated and/or brake fluid is delivered, as is known from piston pumps. Piston cylinder unit 9 may therefore also be understood as a piston pump and, in general, as a hydraulic pump 10. Together with electric motor 2 and transmission 3, piston cylinder unit 9 forms a pump assembly 11 for generating a brake pressure for service braking with the aid of a hydraulic power vehicle braking system 12 using external power. Moreover, pump assembly 11 is used to generate a brake pressure and/or to deliver brake fluid for a slip control via hydraulic vehicle braking system 12.

Pump assembly 11 is attached to or in a hydraulic block 13 which is used to mechanically fasten and hydraulically interconnect hydraulic components 14 of a brake force control. In addition to pump assembly 11, such hydraulic components 14 are solenoid valves, check valves, hydraulic accumulators, and damping chambers which are symbolically illustrated in the drawing by one solenoid valve.

Hydraulic wheel brakes 15, whose wheel brake pressures are controllable in a wheel-individual manner with the aid of hydraulic components 14, are connected to hydraulic block 13.

In addition to hydraulic components 14 and pump assembly 11, a brake master cylinder 16, which is actuatable via muscle power and which is used for assisted braking in the case of failure of pump assembly 11, is situated in hydraulic block 13. As already mentioned above, service braking takes place via external power, the brake pressure for service braking being generated with the aid of pump assembly 11. Brake master cylinder 16 is only used for service braking as a setpoint value indicator for a brake pressure which is controlled or regulated via hydraulic components 14. A slip control also takes place via hydraulic components 14 using which a wheel-individual brake pressure control is possible. Such slip controls are, for example, an anti-lock system, a traction control system, an electronic stability control system and/or an electronic stability program, for which the abbreviations ABS, TCS, ESC and ESP are commonly used. Such slip controls and brake force controls for service braking using external power are known per se and are not explained here in greater detail.

Hydraulic blocks 13 are also known from hydraulic power and/or slip-controlled vehicle braking systems. Typically, these involve flat, cuboid-shaped metal blocks, made in most cases from an aluminum alloy, whose thickness is approximately ¼ to ⅓ of a width or length. As a result of machining, hydraulic blocks 13 include diameter-staggered or non-staggered blind holes and/or through holes for accommodating hydraulic components 14, brake master cylinder 16, and piston cylinder unit 4 which are hydraulically interconnected with one another through bores in hydraulic block 13. Instead of a single circuit brake master cylinder 16 (as illustrated), hydraulic block 13 may also include a dual circuit or a multi-circuit brake master cylinder (not illustrated).

On a low-pressure or an unpressurized side, cylinder 9 of piston cylinder unit 4 communicates with a reservoir 17 in which possible leakage fluid is collected, i.e. brake fluid inadvertently leaking from piston cylinder unit 4.

For controlling or regulating a brake force or a brake pressure, hydraulic block 13 includes an electronic control 18 which may also be understood as an electronic control unit. Electronic control 18 controls or regulates hydraulic components 14 and pump assembly 11, a wheel-individual brake force and brake pressure control being possible. Hydraulic block 13 includes a required or at any rate provided installation position in which electronic control 18 is located below piston cylinder unit 4, below transmission 3 and/or below electric motor 2. Electronic control 18 includes a fluid sensor 19 with the aid of which brake fluid inadvertently leaking from piston cylinder unit 4 is determinable prior to entering electric motor 2. An electrical resistance is measured, for example, between two points on a circuit board of electronic control 18 which is rendered electrically conductive by possible brake fluid. The brake fluid quantity is so low in this case that a function of the electronic system is not impaired. Other fluid sensors 19 are also possible. With the aid of fluid sensor 19, an indication for necessary maintenance or repair may be provided already in the case of a small quantity of brake fluid which leaked from cylinder 9 and which does not impair the function of electronic control 18 and of electric motor 2.

What is claimed is:

1. A pump assembly for a hydraulic vehicle braking system, comprising:
    a hydraulic pump that includes a piston cylinder unit that includes an electric motor and a piston that is drivable by the electric motor; and
    an electronic control unit that:
        is configured to regulate the hydraulic pump;
        is arranged, when the pump assembly is installed in the vehicle braking system, below the piston cylinder unit; and
        includes a circuit board with a fluid sensor arranged on the circuit board, wherein the fluid sensor is configured to detect brake fluid leaking from the piston cylinder unit by measuring an electrical resistance between two points on the circuit board.

2. The pump assembly of claim 1, wherein the fluid sensor is situated under a region that is between the piston and the electric motor.

3. The pump assembly of claim 1, wherein the hydraulic pump includes a transmission which is drivable by the electric motor and which drives the piston.

4. The pump assembly of claim 1, further comprising:
    hydraulic valves configured for individually controlling brake pressure in hydraulic wheel brakes; and
    a cuboid-shaped hydraulic block in which the hydraulic valves and the piston cylinder unit are mechanically fastened and that includes bores by which the hydraulic valves and the piston cylinder unit are hydraulically interconnected.

5. The pump assembly of claim 4, further comprising a brake master cylinder, wherein the pump assembly is configured to apply a brake force via the brake master cylinder when the piston cylinder unit fails and wherein the brake master cylinder is mechanically fastened in the hydraulic block.

\* \* \* \* \*